United States Patent
Olmstead

(10) Patent No.: US 11,046,528 B2
(45) Date of Patent: *Jun. 29, 2021

(54) HORIZONTAL MOTION CONVEYORS HAVING MULTIPLE DRIVES

(71) Applicant: Precision, Inc., Pella, IA (US)

(72) Inventor: Rocky Olmstead, Whitemore, IA (US)

(73) Assignee: Precision, Inc., Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,016

(22) Filed: Apr. 17, 2020

(65) Prior Publication Data
US 2020/0339358 A1  Oct. 29, 2020

Related U.S. Application Data

(60) Provisional application No. 62/838,541, filed on Apr. 25, 2019.

(51) Int. Cl.
| | |
|---|---|
| *B65G 27/06* | (2006.01) |
| *B65G 27/04* | (2006.01) |
| *B65G 27/12* | (2006.01) |
| *B65G 27/30* | (2006.01) |
| *B65G 27/08* | (2006.01) |

(52) U.S. Cl.
CPC .............. *B65G 27/04* (2013.01); *B65G 27/08* (2013.01); *B65G 27/12* (2013.01); *B65G 27/30* (2013.01); *B65G 2203/0291* (2013.01); *B65G 2207/28* (2013.01); *B65G 2811/092* (2013.01); *B65G 2811/097* (2013.01); *B65G 2812/0308* (2013.01); *B65G 2812/0336* (2013.01); *B65G 2812/0388* (2013.01)

(58) Field of Classification Search
CPC ........ B65G 27/04; B65G 27/06; B65G 27/08; B65G 27/18; B65G 27/20; B65G 27/28; B65G 27/30; B65G 27/32; B65G 27/34; B65G 37/005; B65G 69/0425; B65G 2203/0291; B65G 2811/092; B65G 2811/097; B65G 2812/0336; B65B 37/04
USPC .... 198/577, 752.1, 753, 758, 760, 761, 762, 198/767, 770; 414/525.7; 209/920, 921
See application file for complete search history.

(56) References Cited

U.S. PATENT DOCUMENTS

| | | | | |
|---|---|---|---|---|
| 3,332,293 A | * | 7/1967 | Austin | B06B 1/162 74/61 |
| 3,342,075 A | * | 9/1967 | Lowe | B06B 1/164 74/61 |
| 3,434,586 A | * | 3/1969 | Morris | H02P 27/026 198/762 |
| 4,196,637 A | * | 4/1980 | Barrot | B06B 1/166 209/367 |
| 4,255,254 A | * | 3/1981 | Faust | B06B 1/166 198/770 |

(Continued)

*Primary Examiner* — Joseph A Dillon, Jr.
(74) *Attorney, Agent, or Firm* — Armstrong Teasdale LLP

(57) ABSTRACT

Horizontal motion conveyors for moving material are disclosed. The horizontal motion conveyor includes multiple drives. The second drive may float relative to the first drive. The conveyor may be made successively longer by including additional floating drives. Each drive may include a motor such as a servomotor that is connected to the driveshaft that drives the horizontal motion of the conveyor. A control system may control the rotation and positioning of the shafts.

20 Claims, 18 Drawing Sheets

(56) References Cited

U.S. PATENT DOCUMENTS

| | | | | |
|---|---|---|---|---|
| 4,331,263 A * | 5/1982 | Brown | ............. | B65G 27/32 198/751 |
| 4,527,747 A * | 7/1985 | Scharmer | ............. | B06B 1/166 241/26 |
| 5,131,525 A * | 7/1992 | Musschoot | ............. | B06B 1/166 198/763 |
| 5,351,807 A | 10/1994 | Svejkovsky et al. | | |
| 5,392,898 A * | 2/1995 | Burgess, Jr. | ............. | B06B 1/166 198/750.8 |
| 5,409,101 A | 4/1995 | Ahmed et al. | | |
| 5,489,019 A * | 2/1996 | DiNanno | ............. | B65G 47/1492 193/25 FT |
| 5,584,375 A * | 12/1996 | Burgess, Jr. | ............. | B06B 1/166 198/750.1 |
| 5,794,757 A | 8/1998 | Svejkovsky et al. | | |
| 5,938,001 A * | 8/1999 | Turcheck, Jr. | ............. | B06B 1/166 198/770 |
| 5,979,640 A | 11/1999 | Horton | | |
| 6,145,652 A * | 11/2000 | Durnil | ............. | B06B 1/166 198/753 |
| 6,189,683 B1 | 2/2001 | Svejkovsky et al. | | |
| 6,286,658 B1 * | 9/2001 | Hufford | ............. | B65G 27/08 198/760 |
| 6,357,579 B1 * | 3/2002 | Patterson | ............. | B65G 27/24 198/760 |
| 6,415,911 B1 | 7/2002 | Svejkovksy et al. | | |
| 6,464,070 B1 | 10/2002 | Morinaka et al. | | |
| 6,598,734 B1 * | 7/2003 | Rosenstrom | ............. | B06B 1/166 198/758 |
| 6,601,695 B1 * | 8/2003 | Rosenstrom | ............. | B06B 1/16 198/750.1 |
| 6,991,091 B2 | 1/2006 | Thomson et al. | | |
| 7,387,198 B2 | 6/2008 | Thomson | | |
| 7,650,986 B2 | 1/2010 | Kwasniewicz | | |
| 7,975,835 B2 | 7/2011 | Pax | | |
| 8,066,114 B2 | 11/2011 | Svejkovsky et al. | | |
| 8,272,502 B2 * | 9/2012 | Pax | ............. | B65G 27/12 198/750.1 |
| 8,561,788 B2 | 10/2013 | Knodell, Jr. et al. | | |
| 8,752,695 B2 | 6/2014 | Kwasniewicz et al. | | |
| 9,027,744 B1 | 5/2015 | Balcar | | |
| 9,126,765 B2 | 9/2015 | Groenewald et al. | | |
| 9,452,890 B2 | 9/2016 | Spaulding et al. | | |
| 9,776,805 B2 | 10/2017 | Groenewald | | |
| 10,124,963 B1 * | 11/2018 | Steffes, Jr. | ............. | B65G 27/32 |
| D866,908 S | 11/2019 | Friesen | | |
| 10,569,304 B2 * | 2/2020 | Bellec | ............. | B65G 27/28 |
| 10,610,897 B2 * | 4/2020 | Fujimoto | ............. | B06B 1/16 |
| D899,022 S * | 10/2020 | Olmstead | ............. | D34/29 |
| 10,974,907 B2 * | 4/2021 | Olmstead | ............. | B65G 27/12 |
| 2002/0088693 A1 * | 7/2002 | Takasan | ............. | B65G 54/00 198/752.1 |
| 2003/0098220 A1 * | 5/2003 | Kraus | ............. | B06B 1/16 198/758 |
| 2004/0251115 A1 | 12/2004 | Spoeler | | |
| 2005/0081480 A1 | 4/2005 | Gerke | | |
| 2007/0131522 A1 * | 6/2007 | Taylor | ............. | B65G 27/32 198/753 |
| 2008/0041494 A1 | 2/2008 | Paavola | | |
| 2009/0000923 A1 | 1/2009 | Jager | | |
| 2009/0250322 A1 | 10/2009 | Jager | | |
| 2010/0213032 A1 | 8/2010 | Bugge | | |
| 2014/0041987 A1 * | 2/2014 | Kimura | ............. | B65G 27/24 198/348 |
| 2014/0097065 A1 * | 4/2014 | Woiler | ............. | B65G 27/28 198/769 |
| 2016/0107841 A1 * | 4/2016 | Spaulding | ............. | H02K 41/02 198/502.1 |
| 2017/0001804 A1 | 1/2017 | Bettati | | |
| 2017/0088031 A1 | 3/2017 | Baker et al. | | |
| 2020/0039752 A1 | 2/2020 | Massey, Jr. | | |
| 2020/0115165 A1 | 4/2020 | Olmstead et al. | | |

* cited by examiner

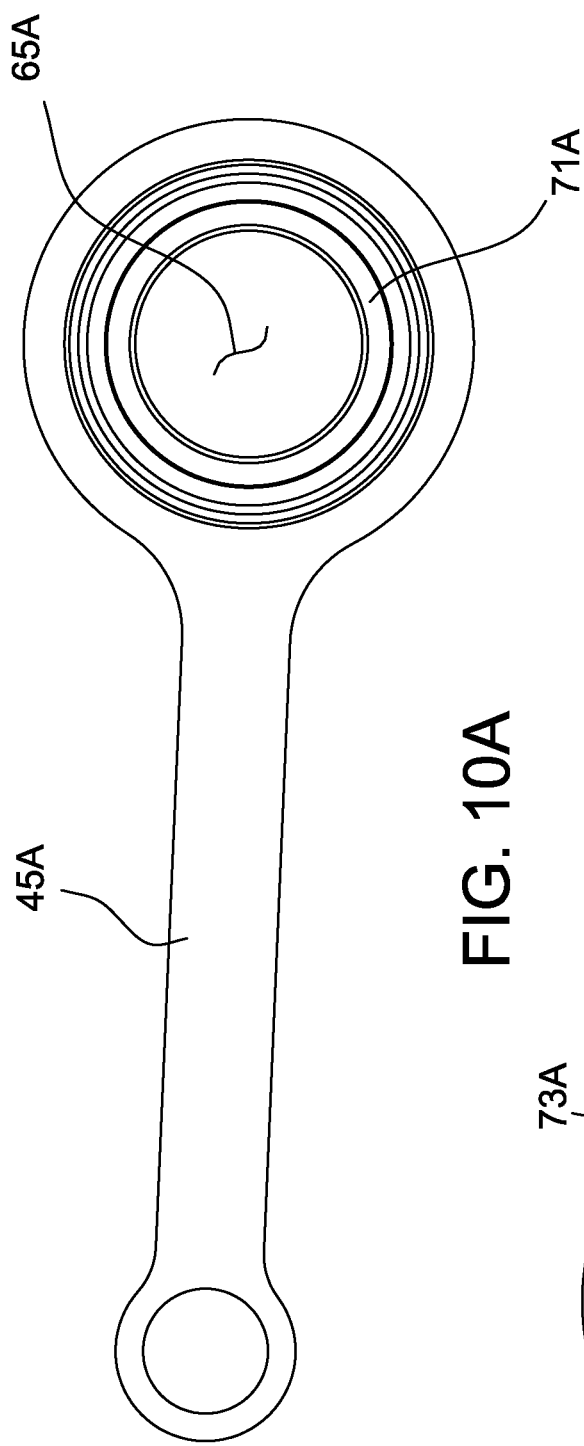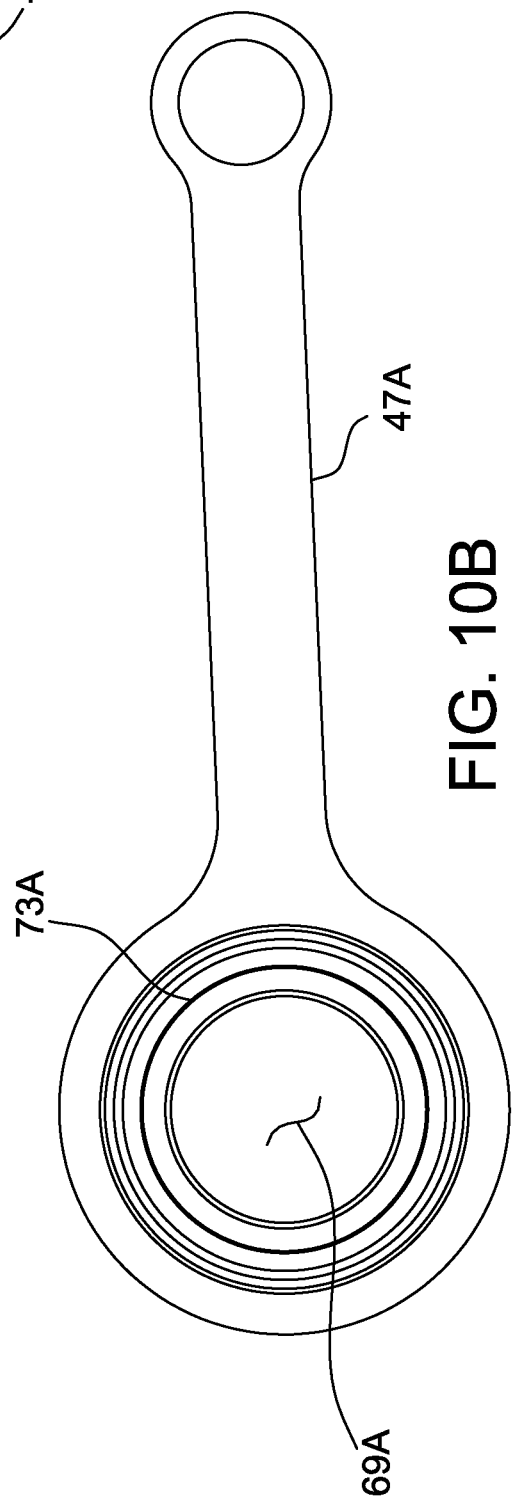

HORIZONTAL MOTION CONVEYORS HAVING MULTIPLE DRIVES

CROSS-REFERENCE TO RELATED APPLICATIONS

This application claims the benefit of U.S. Provisional Patent Application No. 62/838,541, filed Apr. 25, 2019, which is incorporated herein by reference in its entirety.

FIELD OF THE DISCLOSURE

The field of the disclosure relates to horizontal motion conveyors having multiple drives for moving material.

BACKGROUND

Horizontal motion conveyors operate by oscillating the pan over which material is carried forward and back relatively quickly. The speeds at which the conveyor moves forward and back changes over the cycle of the pan to allow the bulk material to slide along the conveyor. For example, the conveyor forward acceleration may be less than the rearward acceleration. This causes the inertia of the material to exceed the friction force which causes the material to slide forward. This allows bulk material to be conveyed with little or no bouncing which reduces the vertical impact of the bulk material during conveying. This causes less breakage of the bulk material relative to other conveyor systems such as vibratory conveyors.

In some applications, it is desirable to allow the horizontal motion conveyor to reverse direction. This allows the direction in which material flows to be controlled for sorting or to vary the downstream processing of the material. For example, product flow may be reversed to accumulate material evenly on the pan or to reject unwanted product before downstream processing (e.g., as a result of foreign contamination or out of specification product at start-up). Reversing product flow also enables product to be directed to one of two downstream processing operations or to allow product to be split between such processing operations. Conventionally, horizontal motion conveyors change the direction of the flow of material by stopping and reversing the drive motor or by altering one or more components of the drive assembly used to move the conveyor pan forward and back. Stopping and restarting the conveyor results in unnecessary downtime, reduces the lifetime of components, and is less efficient (e.g., uses more energy).

In some instances, bulk material must be transferred over relatively long distances. Conventionally, the bulk material is transferred over multiple conveyors connected in series. Use of multiple conveyors adds complexity and cost to the conveying system. A need exists for horizontal motion conveyors that allow bulk material to be transferred over relatively long distances with a single conveyor.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a horizontal motion conveyor for moving material. The horizontal motion conveyor includes a pan having a floor for carrying material toward an end of the pan. The conveyor includes a first drive having a first counterweight assembly for reducing the vibration of the conveyor. The drive includes a first driveshaft that causes the pan to oscillate forward and back causing material to move toward an end of the pan and that enables the counterweight assembly to oscillate forward and back. The first drive includes a first drive motor for rotating the driveshaft. The horizontal motion conveyor includes a second drive. The second drive is a floating drive. The second drive includes a second counterweight assembly for reducing the vibration of the conveyor. The second drive includes a second driveshaft that causes the pan to oscillate forward and back causing material to move toward an end of the pan and that enables the counterweight assembly to oscillate forward and back. The second drive includes a second drive motor for rotating the driveshaft. A floating mechanism enables the second drive to move relative to the first drive.

Another aspect of the present disclosure is directed to a horizontal motion conveyor for moving material. The horizontal motion conveyor includes a pan having a floor for carrying material toward an end of the pan. A first drive is disposed below the pan that causes the pan to oscillate forward and back causing material to move toward an end of the pan. The first drive includes a first driveshaft and a first drive motor that rotates the first drive shaft. A second drive is disposed below the pan that causes the pan to oscillate forward and back causing material to move toward an end of the pan. The second drive includes a second driveshaft and a second drive motor that rotates the second drive shaft. A controller is communicatively coupled to the first drive and communicatively coupled to the second drive. The controller controls the rate of rotation of the first driveshaft and the rate of rotation of the second driveshaft.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 10A is a side view of a first crank arm of the horizontal motion conveyor;

FIG. 10B is a side view of a second crank arm of the horizontal motion conveyor;

Corresponding reference characters indicate corresponding parts throughout the drawings.

DETAILED DESCRIPTION

Figure 1:
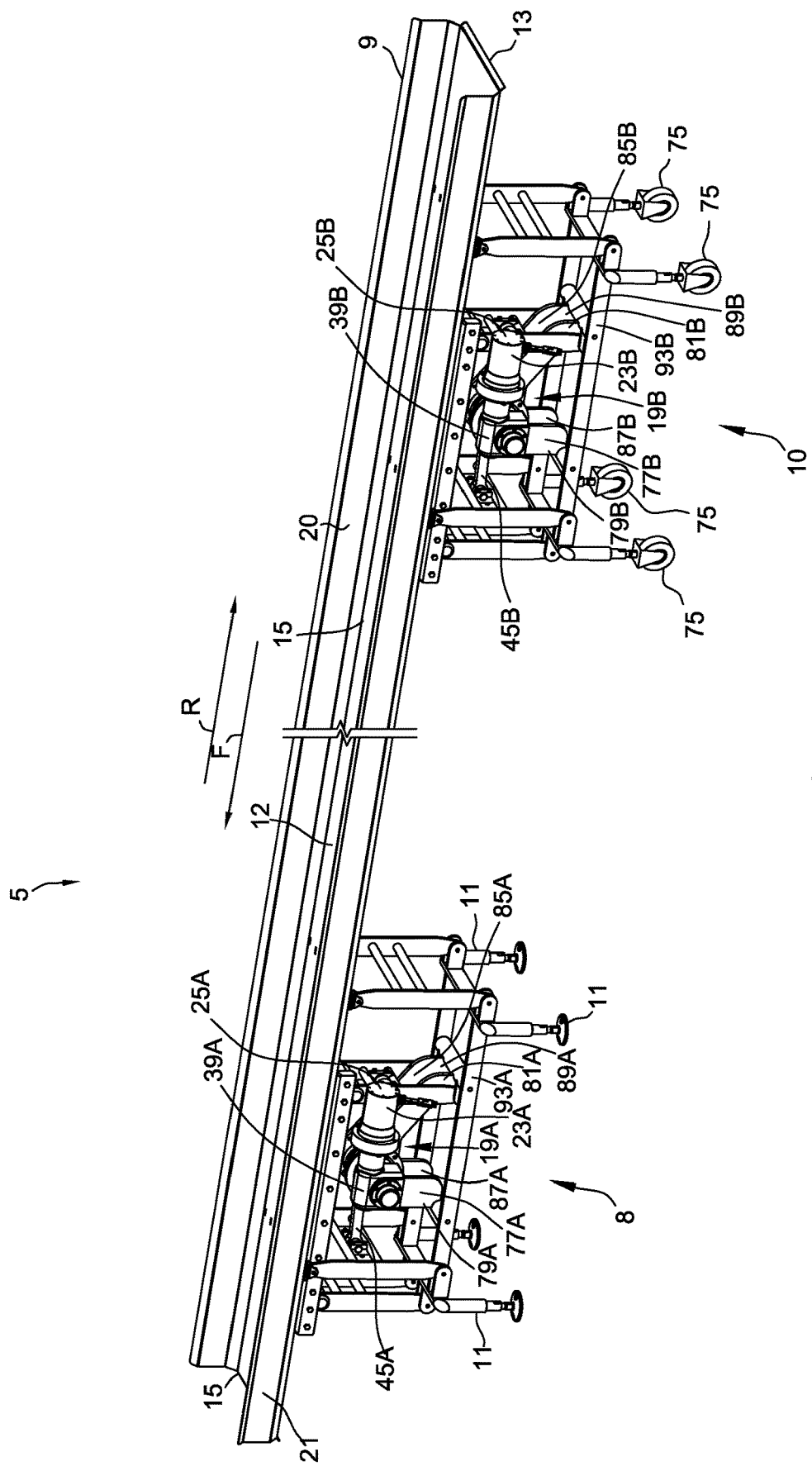
FIG. 1 is a perspective view of a horizontal motion conveyor.
Figure 3:
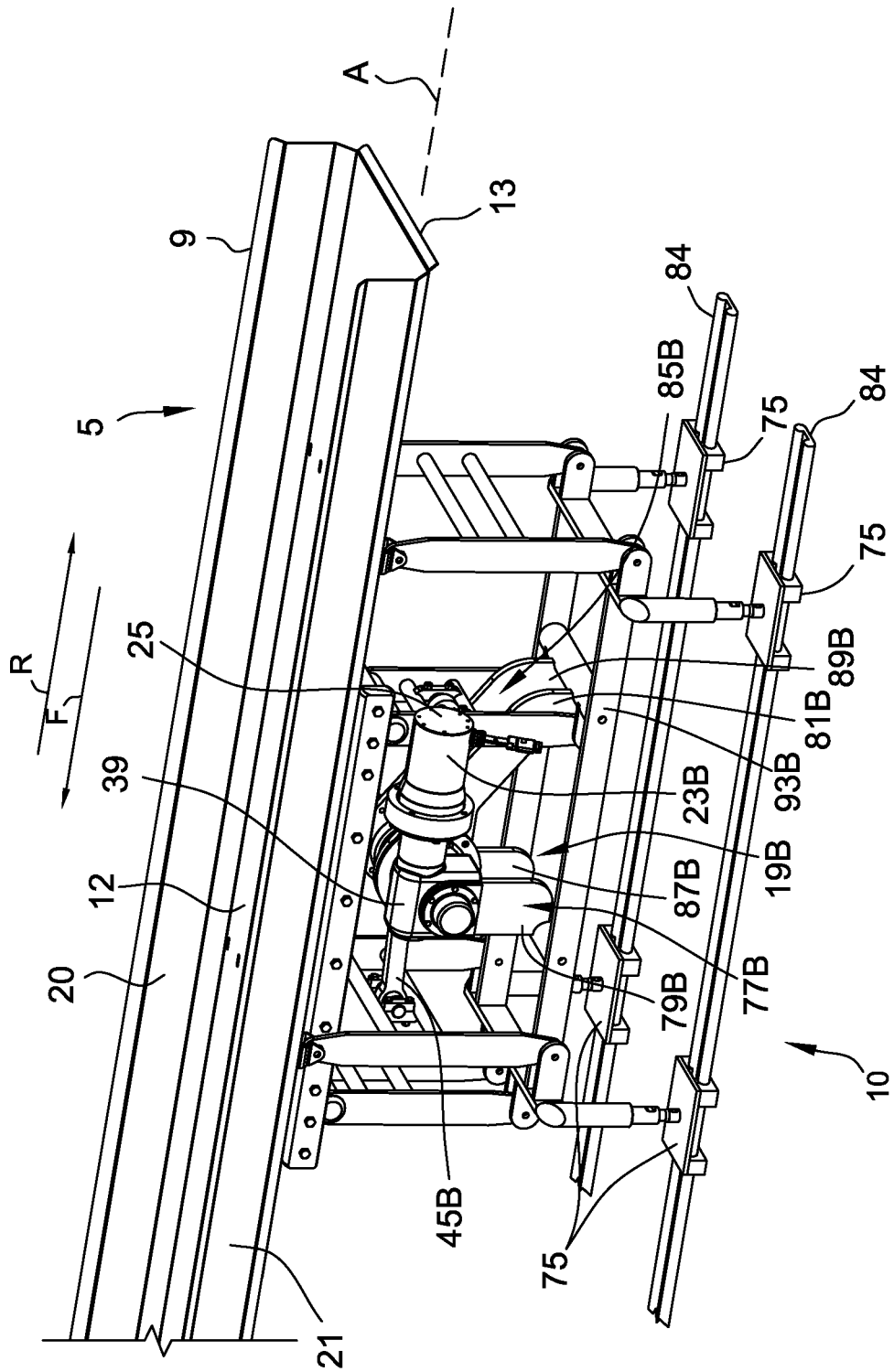
FIG. 3 is a perspective view of another embodiment of a horizontal motion conveyor.
Figure 4:
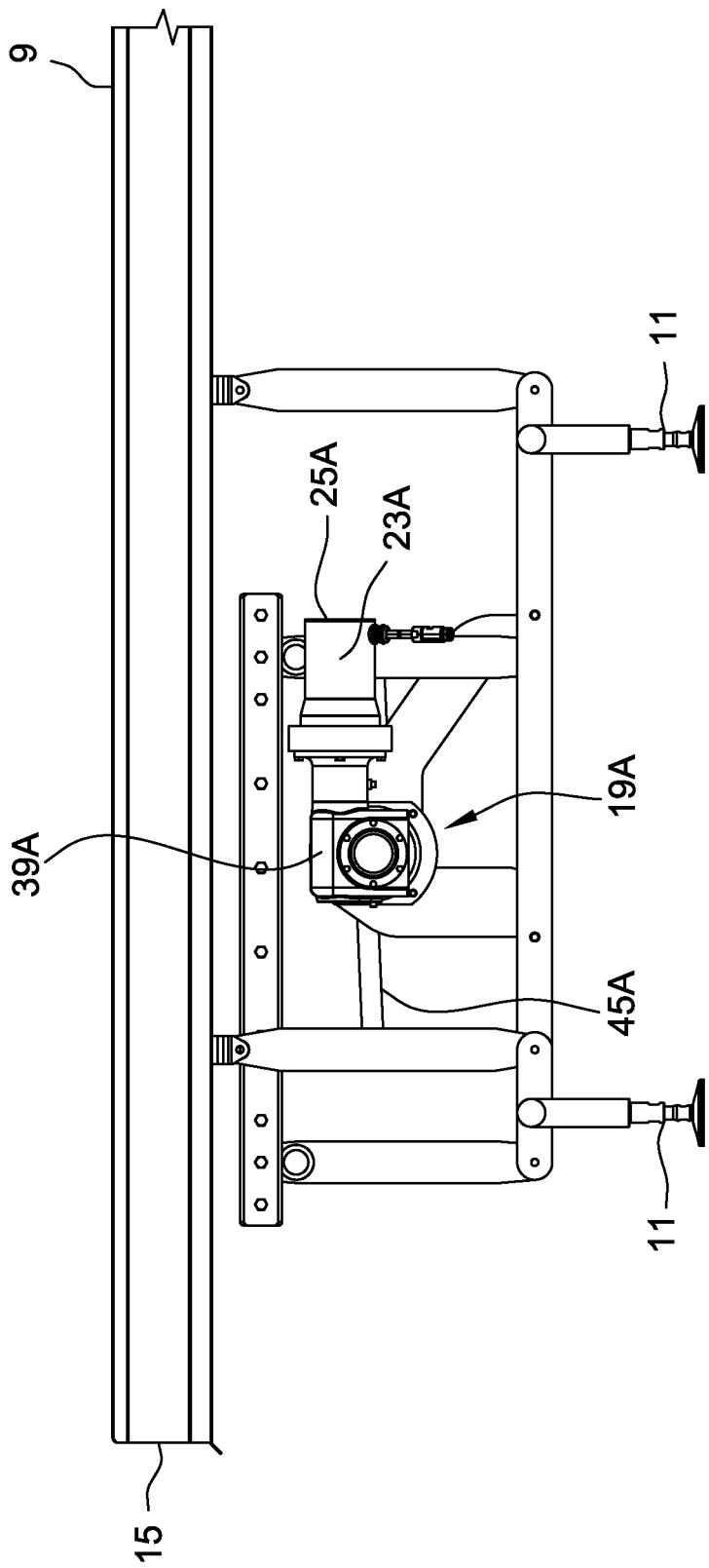
FIG. 4 is a partial side view of the horizontal motion conveyor.
Figure 5:
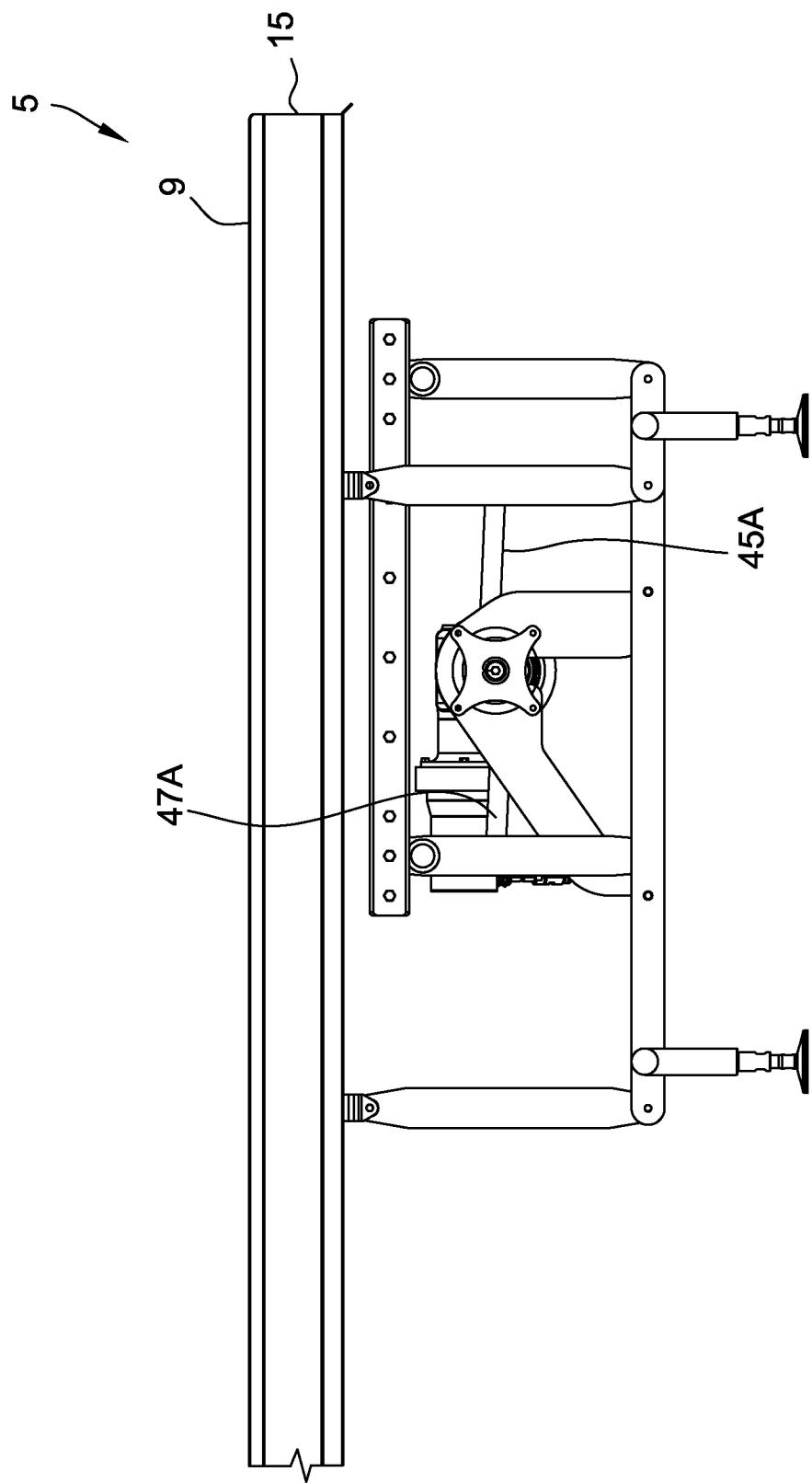
FIG. 5 is another partial side view of the horizontal motion conveyor.

An example horizontal motion conveyor 5 of the present disclosure is shown in FIG. 1. The conveyor 5 includes a first drive 8 and a second drive 10 this is capable of floating relative to the first drive (e.g., moving laterally to allow it to sync with the first drive 8). The first drive 8 may be a stationary drive (e.g., that is anchored to the floor or other framework external to the conveyor 5 or that sets on the floor without components that facilitate movement of the drive relative to the supporting surface) or may also be a floating drive that is capable of moving relative to the second drive. The first drive 8 and the second, floating drive 10 are spaced from each other relative to the longitudinal axis A (FIG. 3).

In the illustrated embodiments, the first drive 8 is a stationary drive. In such embodiments, the first drive 8 and the second drive 10 may be identical except for the configuration in which the drives 8, 10 are supported. The components of the first drive may be indicated by "A" and the corresponding component of the second drive by "B". Description herein of a component of one drive should be understood to apply to the corresponding component of the second drive unless stated otherwise. In some instances, a component may be referenced without "A" and "B" for simplicity and it should be understood that the description of the component applies to the component of the first drive and the corresponding component of the second drive unless stated otherwise. In other embodiments, the first drive 8 and second drive 10 may be arranged differently from one another (e.g., different components or arrangement of components).

The horizontal motion conveyor 5 includes a tray or pan 9 upon which material is transported. The pan 9 includes a first end 13 and a second end 15 and includes a contact surface or floor 12 over which material is carried. The pan 9 includes two sides 20, 21 which extend upward from the floor 12. In some embodiments and as further explained below, the horizontal motion conveyor 5 is configured to move material toward the first end 13 or the second end 15 of the pan 9 (i.e., the flow of material on the pan 9 is reversible). The pan 9 may be made of any material suitable to carry the material which is conveyed by the pan 9. In some embodiments, the pan 9 is made of aluminum, stainless steel or composite plastic. The pan 9 may be horizontal as shown or may be inclined downward or even upward.

Material moves on the pan 9 by use of horizontal motion (which may also be referred to as "linear" motion) that is generated by the first and second drives 8, 10. The drives 8, 10 cause the pan 9 to oscillate forward and back to cause material to slide along the pan 9 either in direction F or direction R. Generally, the horizontal motion conveyor 5 should be distinguished from vibratory conveyors that cause material to bounce along the pan. Such vibratory conveyors may generate vibration by electromagnets or the like. The illustrated horizontal motion conveyor 5 is a direct drive conveyor and, generally, should be distinguished from inertia drive conveyors. However in other embodiments an inertia drive conveyor may be used.

Figure 6:
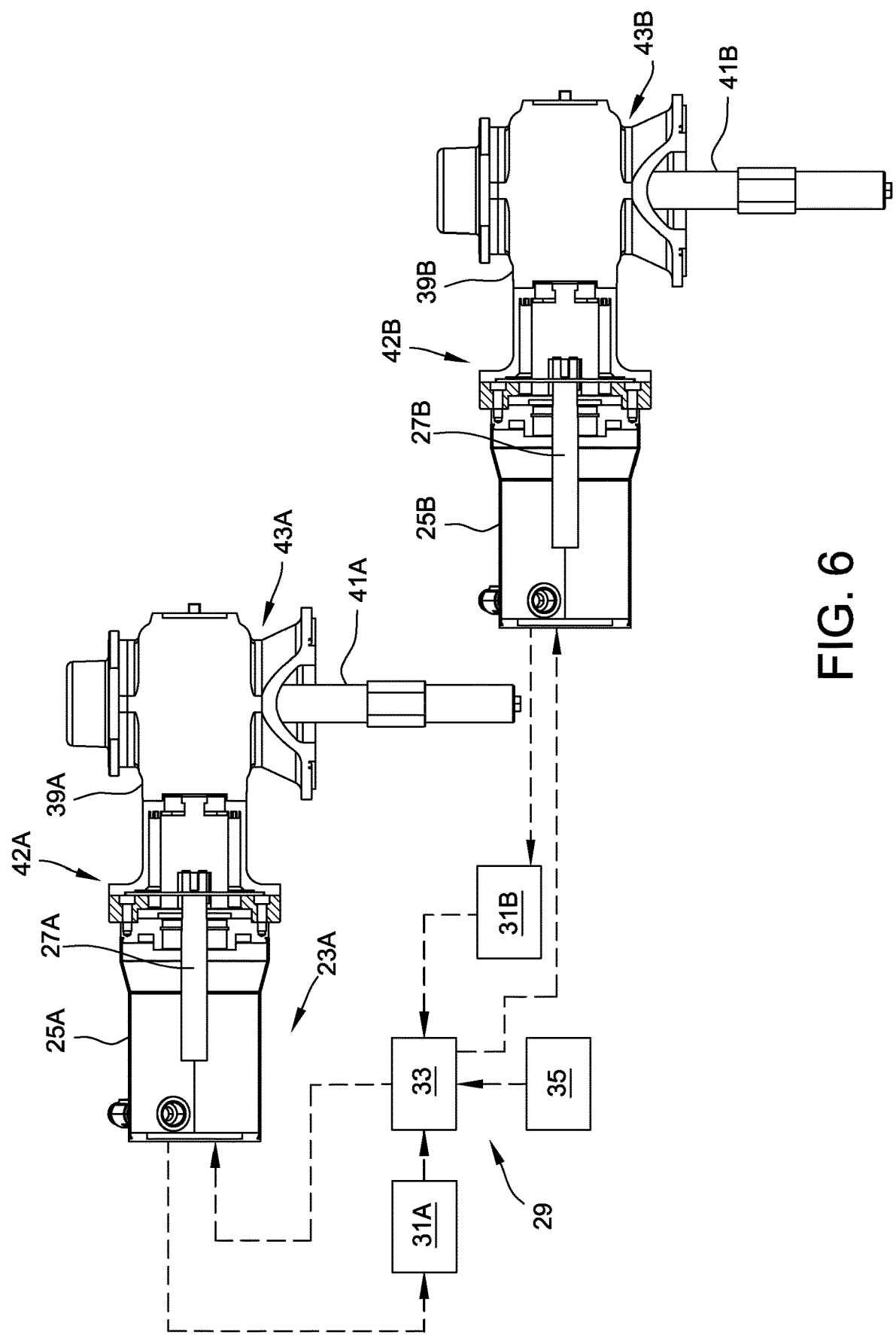
FIG. 6 is a cross-section top view of the drive motor, gearbox and drive shaft of first and second drives of a horizontal motion conveyor with a control system that controls rotation of the drive motor shafts being shown schematically.

The first and second drives 8, 10 each include a drive assembly 19A, 19B that powers movement of the pan 9. Each drive assembly 19A, 19B includes a drive motor which, in the illustrated embodiment, is a rotary servomotor 23A, 23B. Referring now to FIG. 6, each servomotor 23A, 23B includes a motor 25A, 25B that rotates a servomotor shaft 27A, 27B. A servomotor control system 29 controls the rotation and angular position of the shafts 27A, 27B as further described below. An example control system 29 includes sensors 31A, 31B that determine the angular position of each respective servomotor shaft 27A, 27B. Each sensor 31A, 31B is communicatively connected to a controller 33 that controls the rotation and positioning of the shafts 27A, 27B.

The controller 33 is communicatively connected to each servomotor 23A, 23B. In some embodiments, the controller 33 controls the rate of rotation of the motors 25A, 25B and shafts 27A, 27B such as through a variable speed drive (e.g., as with a programmed logic controller (PLC) that controls speed (e.g., cycles/min) to change product speed).

Referring now to FIGS. 7-14 and 18 in which components of the first drive 8 are shown (with the second drive 10 having corresponding components unless stated otherwise), each servomotor 23 is connected to a gearbox 39 to translate the movement of the servomotor shaft 27 to the conveyor driveshaft 41. The gearbox 39 may also increase the torque transferred from the servomotor 23. In the illustrated embodiment, the servomotor shaft 27 and driveshaft 41 are perpendicular to each other and the gearbox 39 changes the direction of the driveline (i.e., the gearbox 39 is a right angle gearbox). In other embodiments, the servomotor shaft 27 and driveshaft 41 are aligned.

In some embodiments, the gearbox 39 includes a worm drive in which a worm screw connected to the servomotor shaft 27 turns a worm gear or wheel connected to the conveyor driveshaft 41. In some embodiments, the gearbox 39 has little or zero backlash (e.g., includes gears that are shimmed to remove the backlash). The gearbox 39 may be connected to the driveshaft 41 by an interference fit 46 (FIG. 8) to reduce or eliminate slippage and backlash. The gearbox 39 may connect to the servomotor shaft 27 and/or to the driveshaft 41 by a keyless lock coupling 42, 43 (FIG. 20). Such keyless lock couplings 42, 43 use a friction fit between the shaft 27, 41 and the gearbox 39 and do not include a key or keyway. For example, the coupling 42, 43 may include clamping collars 52, 54 that draw down on the shafts 27, 41 to allow the keys to be eliminated. In the embodiment illustrated in FIG. 18, the first clamping collar 52 is a gam keyless clamping shaft coupling that connects the servomotor shaft 27 to the male input shaft of the gearbox 39. The second clamping collar 54 is a shrink disk that enables a keyless and reduced or zero backlash connection with the driveshaft 41 (FIG. 6).

In the illustrated embodiment, the servomotor 23 is directly connected to the driveshaft 41 through the gearbox 39 (e.g., the drive assembly 19 does not include cables, chains, or belts that are used to translate rotation of the motor shaft 27 to the driveshaft 41). Stated otherwise, in some embodiments, the driveline from the motor 25 to the driveshaft 41 only includes rotating shafts or gears.

Figure 7:
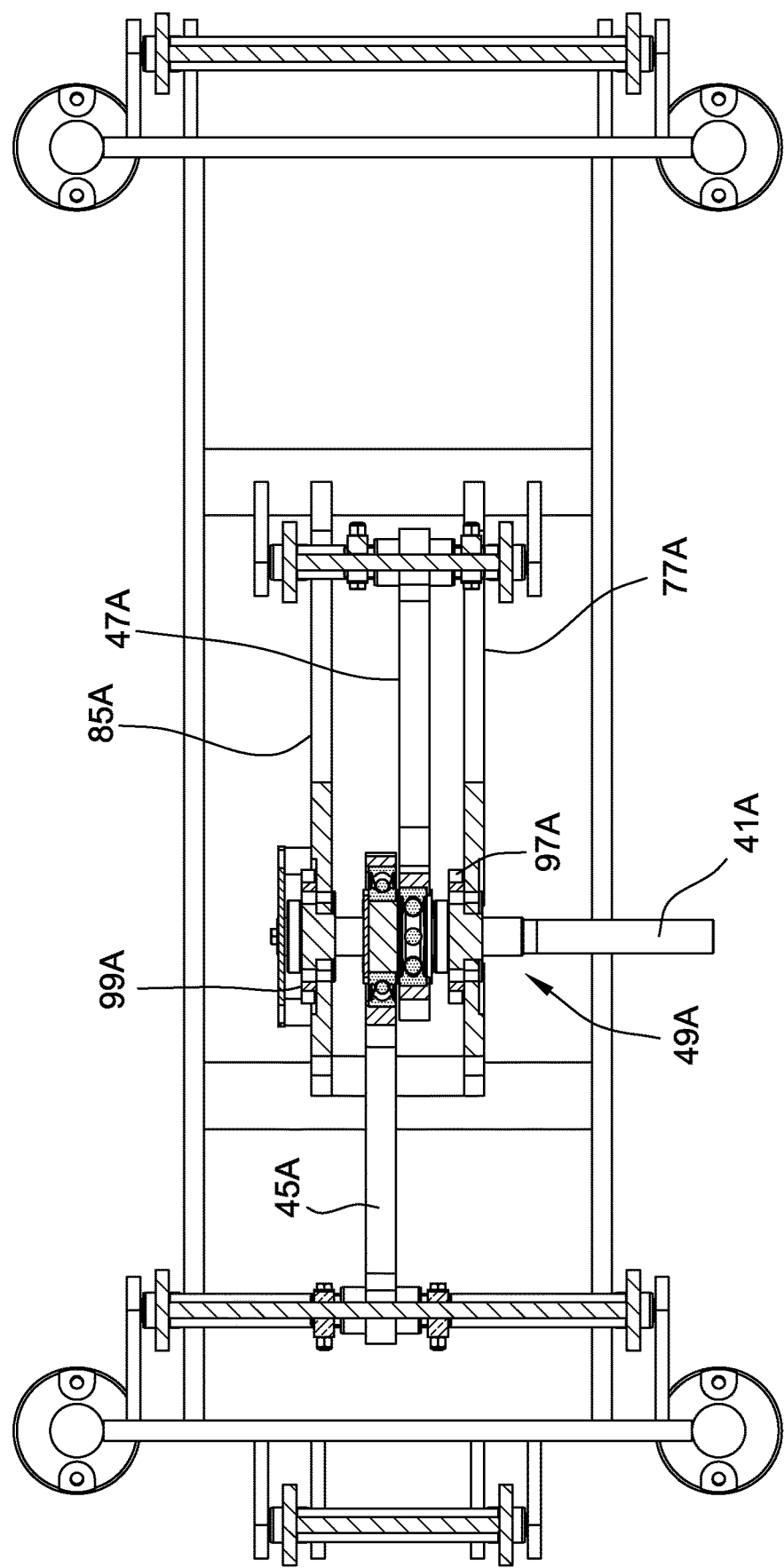
FIG. 7 is a cross-section top view of the first drive of the horizontal motion conveyor.
Figure 8:
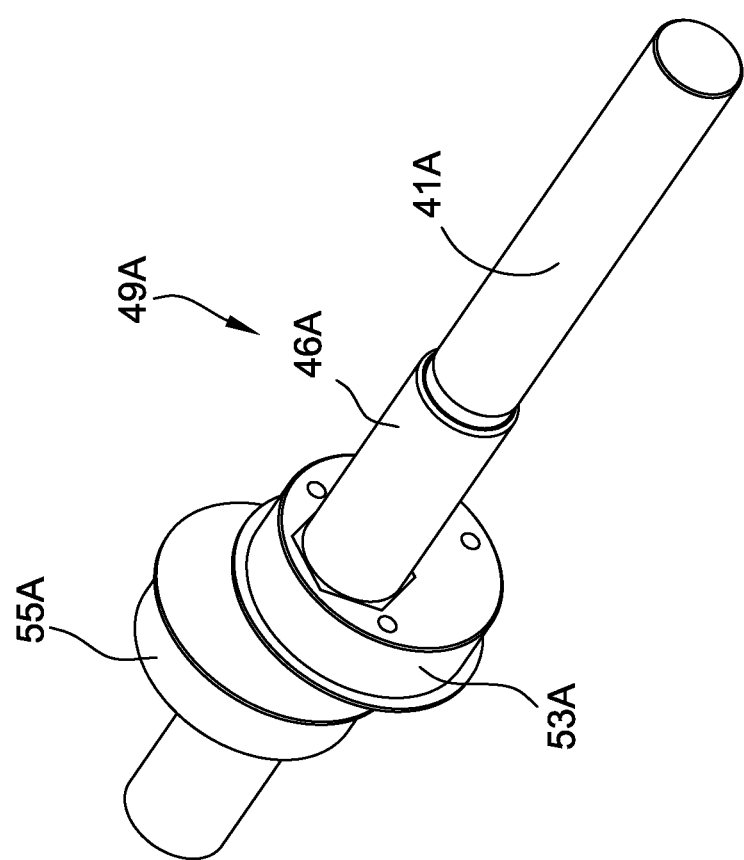
FIG. 8 is a perspective view of a camshaft of the horizontal motion conveyor.

In some embodiments, the drive assemblies 19A, 19B are based on eccentric drive principles. Referring now to FIG. 7 in which the pan is not shown for illustration, the conveyor driveshaft 41 is connected to a first crank arm 45 and second crank arm 47. In the illustrated embodiment, the driveshaft 41 is part of a camshaft 49 and each crank arm 45, 47 moves back and forth relative to the longitudinal axis A (FIG. 1) as the camshaft 41 rotates. As shown in FIG. 8, the camshaft 49 includes a first cam 53 and a second cam 55 that are both connected to the driveshaft 41. In the illustrated embodiment, the first and second cams 53, 55 are eccentric cams. That is, each cam 53, 55 includes a cam through-hole 59, 61 (FIGS. 9A, 9B) defining an axis of rotation $C_{53}$, $C_{55}$ of the cam 53, 55 that is offset from the physical center point $CP_{53}$, $CP_{55}$ (i.e., center point along the diameter $D_{53}$, $D_{55}$) of the cam 53, 55. Each cam 53, 55 includes a crown $CR_{53}$, $CR_{55}$ which is the point on the outer surface 63, 64 of the cam 53, 55 at which the distance from the axis of rotation $C_{53}$, $C_{55}$ to the outer surface 63, 64 is the greatest.

The cam through-holes 59, 61 are hex-shaped and connect to a hex portion of the driveshaft 41. The cams 53, 55 may connect to the hex portion of the driveshaft 41 in an interference fit.

Figure 9B:
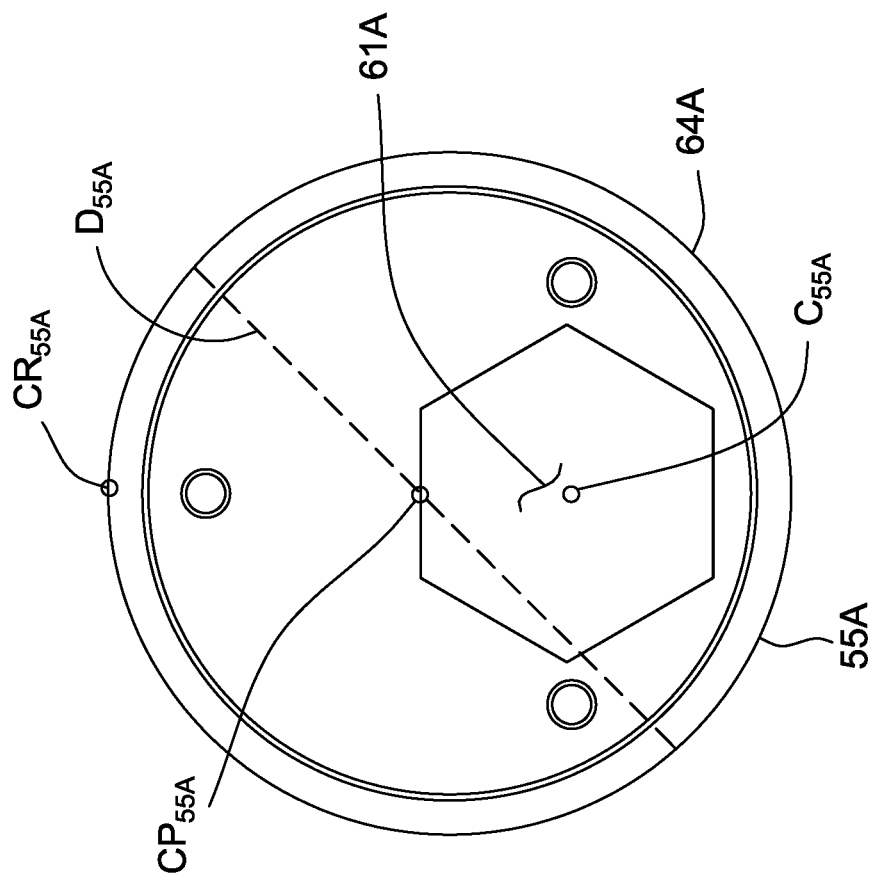
FIG. 9B is a side view of a second cam of the camshaft.
Figure 9A:
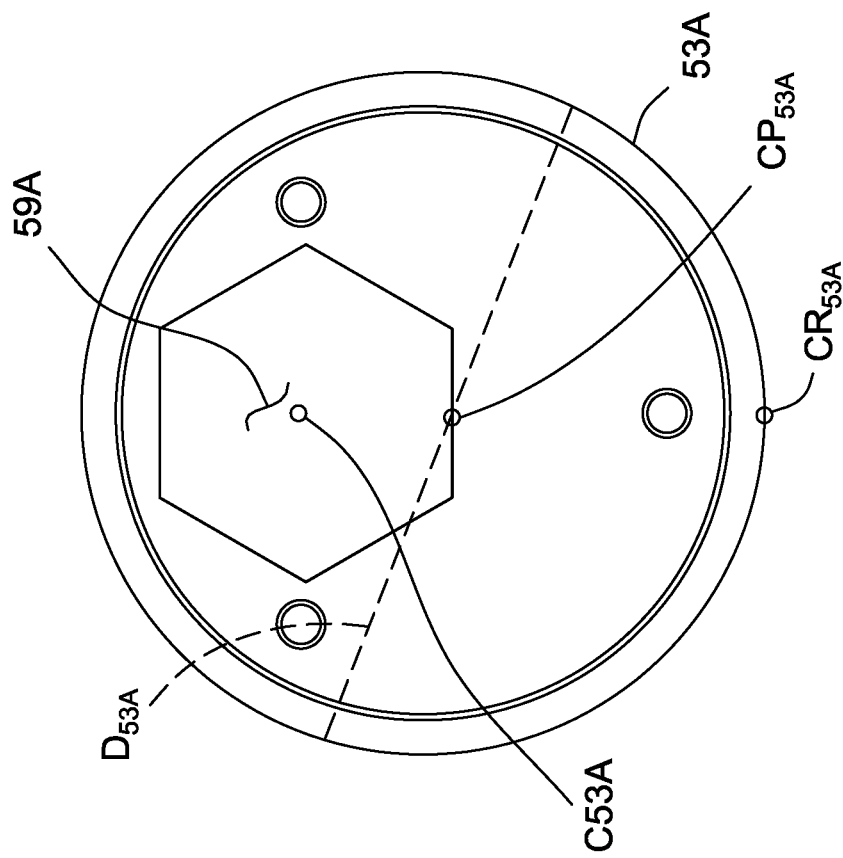
FIG. 9A is a side view of a first cam of the camshaft.
Figure 11:
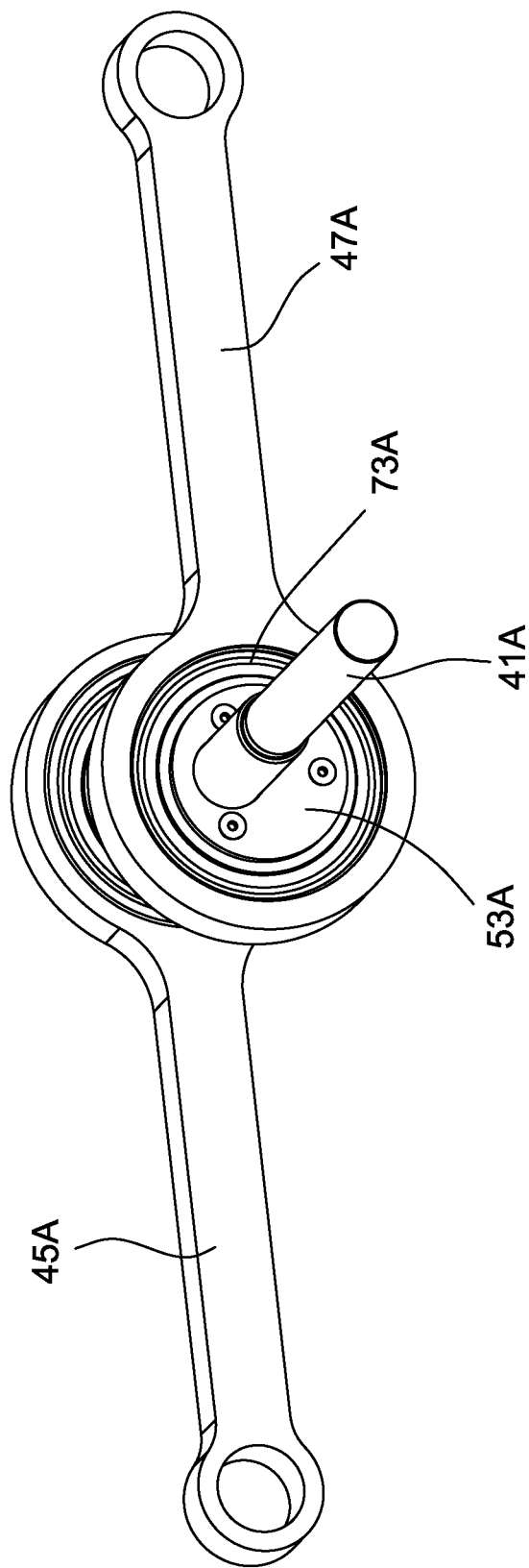
FIG. 11 is a perspective view of the crankshaft and the first and second crank arms.
Figure 12:
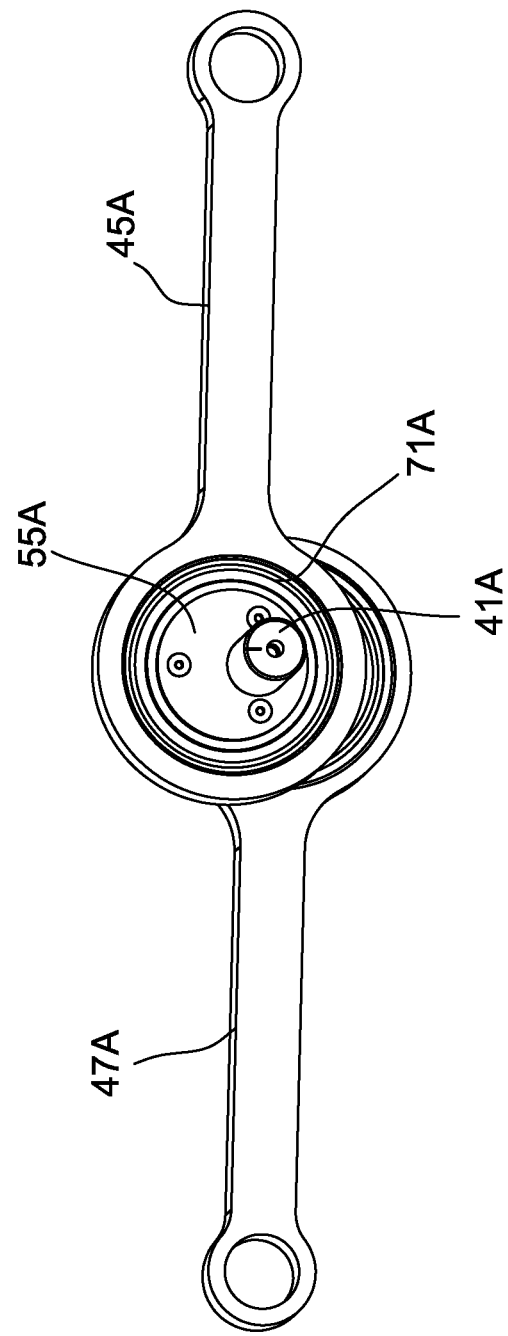
FIG. 12 is another perspective view of the crankshaft and the first and second crank arms.

As shown in FIG. 9A, the first and second cams 53, 55 are offset from each other. That is, the crown $CR_{53}$ of the first cam 53 is angularly offset from the crown $CR_{55}$ of the second cam 55. In the illustrated embodiment, the cams 53, 55 are offset about 180° from each other. In other embodiments, the cams 53, 55 are offset less than 180°. The offset of the cams 53, 55 allows the crank arms 45, 47 to move in opposite directions (e.g., one crank arm being extended while the other is retracted and vice-versa).

The first cam 53 is received in a first crank arm through-hole 65 (FIG. 10A) and the second cam 55 is received in a second crank arm through-hole 69 (FIG. 10B). Each crank arm 45, 47 includes a bearing 71, 73 to facilitate rotation of the cam 53, 55 within each crank arm 45, 47 (FIGS. 9 and 10). The camshaft 49 rotates to cause the crank arms 45, 47 to move back and forth.

The drive assembly 19 is supported by first and second support members 77, 85 (FIG. 1) that are connected to the drive frame 93. The first support member 77 includes first and second support arms 79, 81 connected to the frame 93. The second support member 85 includes first and second support member arms 87, 89 connected to the frame 93. The driveshaft 41 (FIG. 7) is connected to the first and second support members 77, 85 by hubs 97, 99, respectively.

Figure 13:
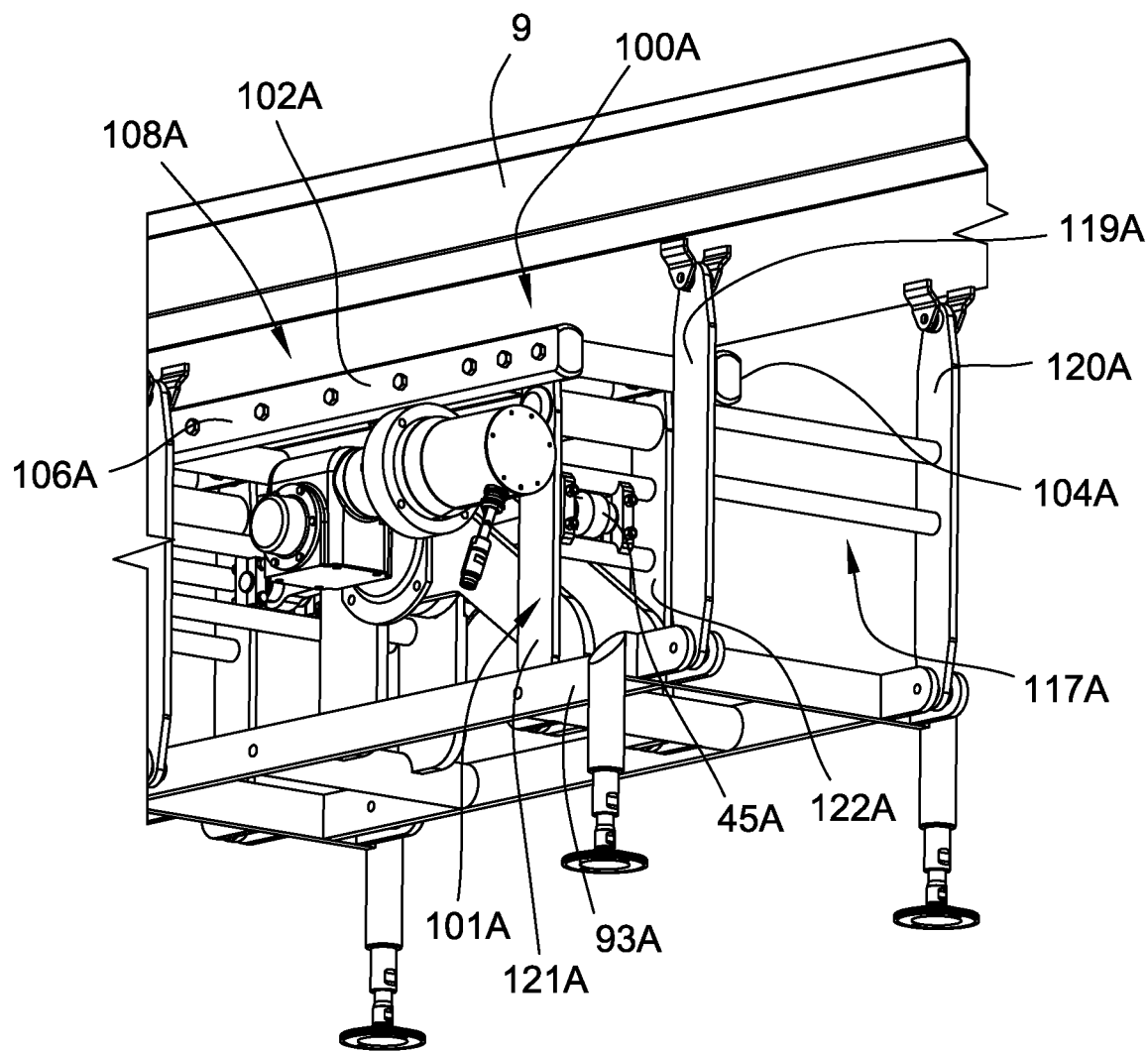
FIG. 13 is a partial detailed perspective view of the horizontal motion conveyor.
Figure 14:
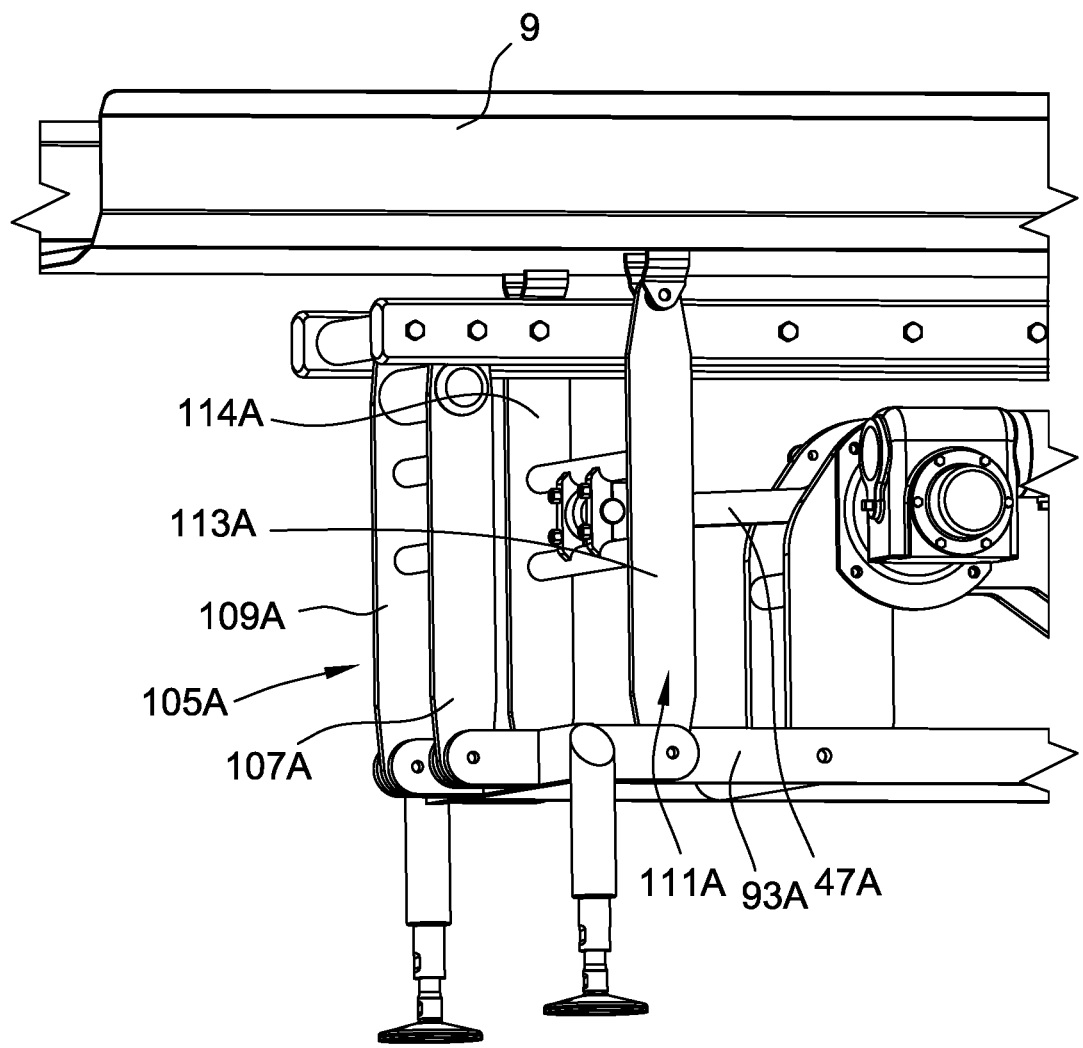
FIG. 14 is another partial detailed perspective view of the horizontal motion conveyor.

Referring now to FIG. 13, each drive 8, 10 includes a counterweight assembly 100 to reduce vibration of the conveyor 5. The counterweight assembly 100 includes a counterweight top structure 102 that moves back and forth relative to the longitudinal axis A (FIG. 1) as the camshaft 49 (FIG. 8) rotates. The counterweight top structure 102 includes first and second rails 104, 106 and weight members 108 (e.g., rods) that extend between the rails 104, 106. In some embodiments, the weight members 108 are interchangeable on the top structure 102 to allow the weight of the counterweight assembly 100 to be changed. The counterweight top structure 102 is supported by a counterweight drive frame 101 and a counterweight idler frame 105 (FIG. 14). The counterweight drive frame 101 (FIG. 13) includes first and second counterweight rocker arms 121, 122. The counterweight idler frame 105 (FIG. 14) includes first and second counterweight idler rocker arms 107, 109.

The first crank arm 45 is pivotally connected to the counterweight drive frame 101. The counterweight drive frame 101 is pivotally connected to the drive frame 93 and the counterweight top structure 102. The counterweight idler frame 105 is also pivotally connected to the drive frame 93 and the counterweight top structure 102. As the first crank arm 45 moves back and forth, the counterweight drive frame 101 pivots relative to the drive frame 93. This causes the counterweight top structure 102 to move back and forth and causes the counterweight idler frame 105 (FIG. 14) to move back and forth in response.

The counterweight top structure 102 is disposed below the pan 9. The counterweight top structure 102 is disposed above the camshaft 49 and is above the drive motor and gearbox 39.

The pan 9 is supported by a pan drive frame 111 (FIG. 14) and a pan idler frame 117 (FIG. 13) of each drive 8, 10. Each pan drive frame 111 includes first and second pan rocker arms 113, 114. The pan idler frame 117 includes first and second pan idler rocker arms 119, 120. The pan drive frame 111 is pivotally connected to the drive frame 93 and is pivotally connected to the pan 9. The pan idler frame 117 is also pivotally connected to the frame 93 and to the pan 9.

Referring now to FIG. 14, the second crank arm 47 is pivotally connected to the pan drive frame 111. As the second crank arm 47 moves back and forth relative to the longitudinal axis A (FIG. 1), the pan drive frame 111 pivots relative to the drive frame 93. This causes the pan 9 to move back and forth and causes the pan idler frame 117 (FIG. 13) to move back and forth in response.

Material moves along the pan 9 due to changes in acceleration and deceleration of the pan as it cycles forward. For example and with reference to FIG. 15, to move material in direction F (FIG. 1), the pan 9 accelerates forward as it moves forward. At the full extension of the second crank arms 47A, 47B, the pan 9 reverses direction, continues to accelerate and then begins to decelerate. When the pan 9 reverses direction again and moves forward (i.e., towards the end of the curve of FIG. 15), the pan 9 has decelerated. The speed profile of FIG. 15 allows the product to slide or "fling" forward on the pan 9 when the pan changes from forward motion to backward motion with little or no product moving back on the pan 9 when the pan changes from backward motion to forward motion. In this manner, product moves toward the second end 15 of the pan in direction F.

According to embodiments of the present disclosure, the angular velocity of the camshafts 49A, 49B during a revolution of the camshaft 49A, 49B is controlled to change the acceleration and deceleration of the pan 9 during its forward and backward cycle. Referring now to FIG. 6, a controller 33 regulates the speed of the camshafts 49A, 49B (and driveshafts 41A, 41B thereof) such as through a variable frequency drive.

Figure 15:
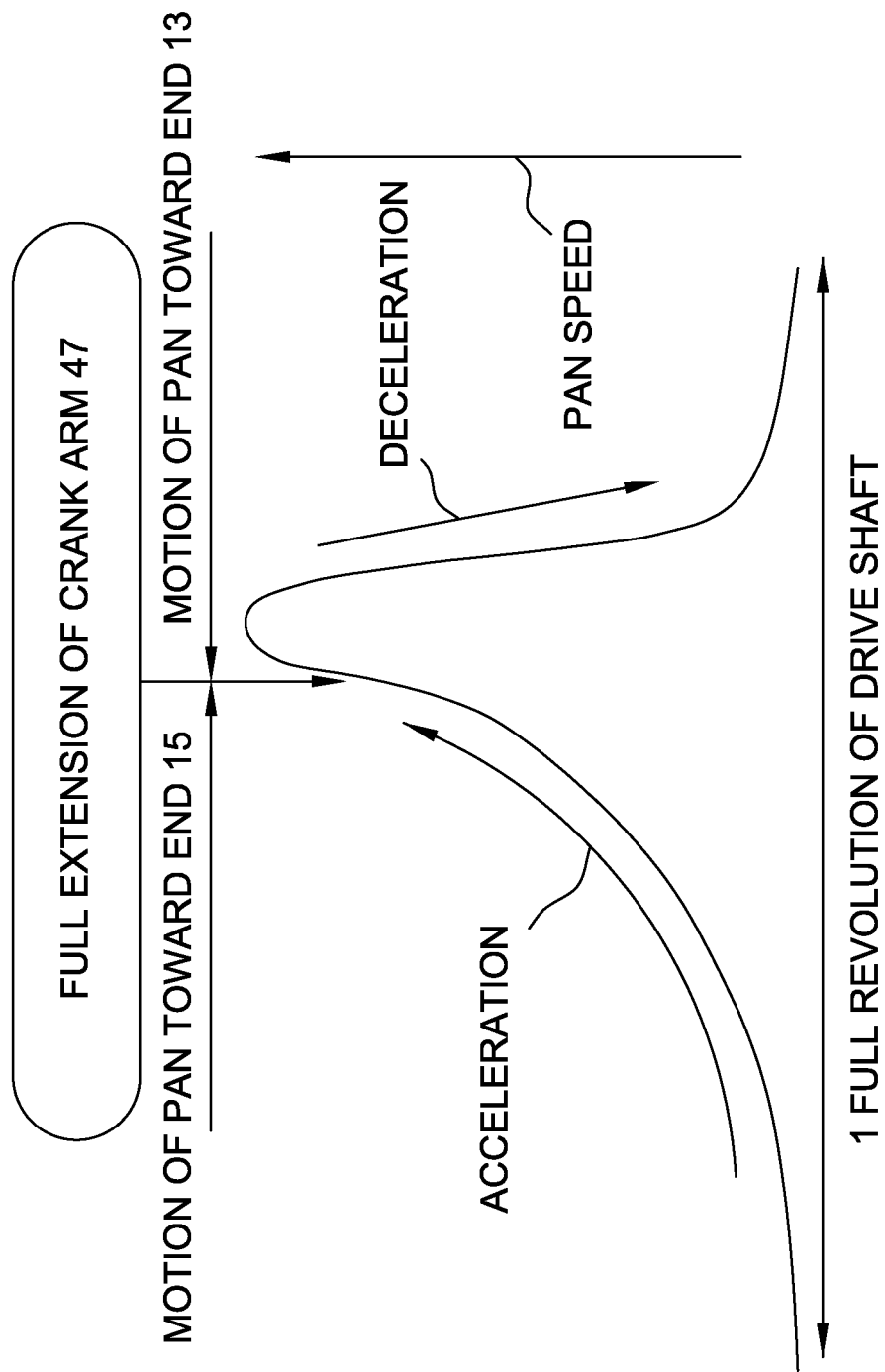
FIG. 15 is a speed profile curve for moving material in a forward direction.
Figure 16:
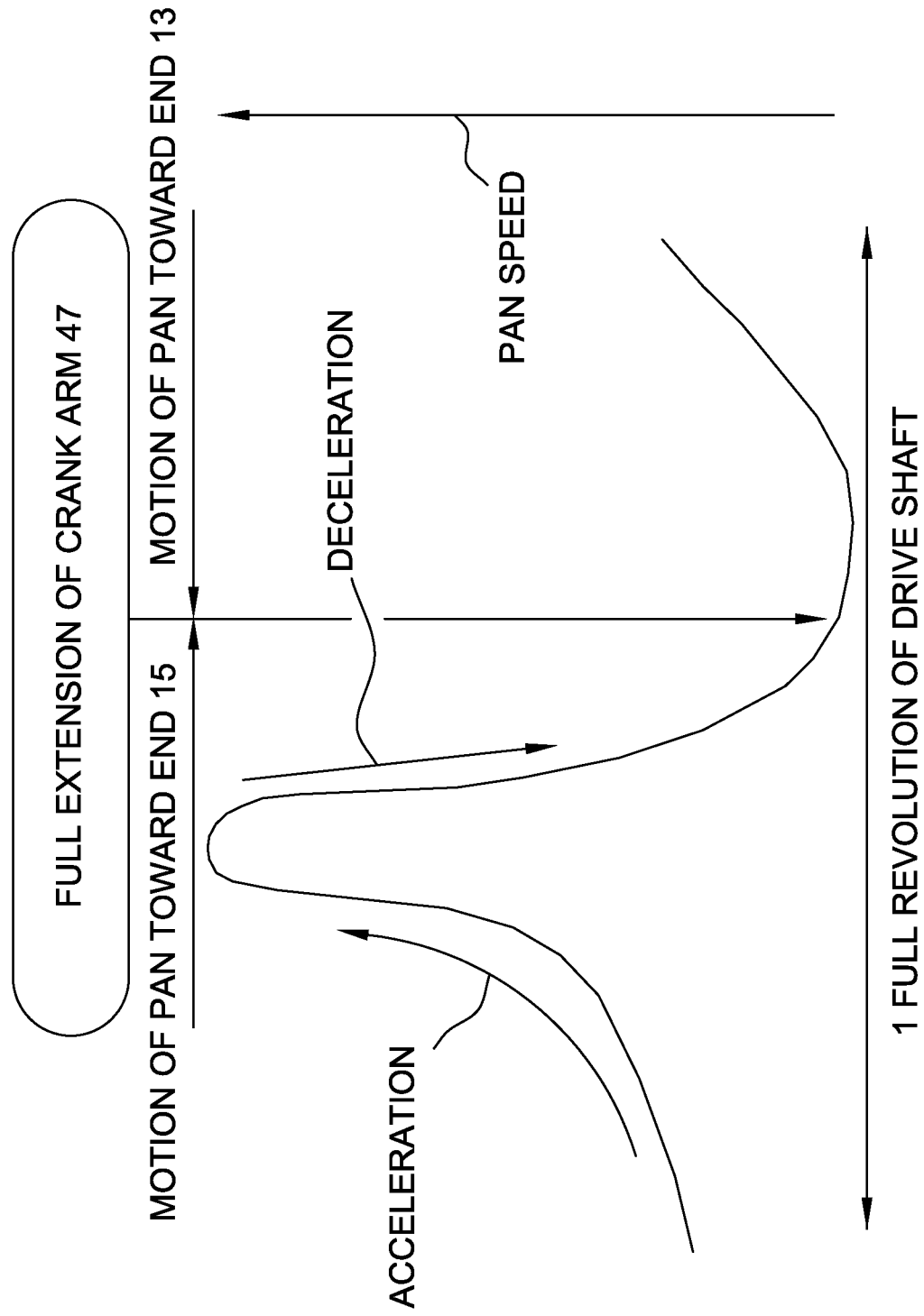
FIG. 16 is a speed profile curve for moving material in a reverse direction.

The controller 33 regulates the speed of the camshafts 49A, 49B to achieve a common acceleration and deceleration profile such as the speed profile of FIG. 15 or of FIG. 16. In some embodiments, the controller 33 regulates speed of rotation of the servomotor shafts 27A, 27B by feedback from the sensors 31A, 31B (i.e., in a feedback control loop such as PID control). The speed at which material moves forward (i.e., the oscillation rate at which the pan moves forward and back) may also be regulated by the controller 33 such as through input by a user in a user interface 35.

The controller 33 includes a processor and a memory. The processor processes the signals received from various sensors, selectors and control devices of the system. The memory stores instructions that are executed by the processor.

Controller 33 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable controller 33, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Wash.). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

In accordance with embodiments of the present disclosure, the direction at which material travels on the pan 9 may be reversed by changing the speed profile of the camshafts 49A, 49B of each drive 8, 10 within a revolution of the camshaft 49A, 49B. This causes the acceleration and deceleration profile of the pan 9 to change. For example and as shown in FIG. 16, the speed curve has been shifted about 180° from the profile of FIG. 15. This causes the material on the pan 9 to slide toward the first end 13 (FIG. 1) of the pan 9 in direction R. As the pan 9 reverses during the revolution of the camshafts 49A, 49B and moves in the direction R, the velocity of the pan 9 is reduced which reduces (or eliminates) the amount of material that slides back toward end 15.

In the embodiment illustrated in FIGS. 15 and 16, the speed curve has shifted 180°. Generally, the speed profile may be altered in any manner that allows material to reverse its direction on the pan 9. The speed profiles of FIGS. 15 and 16 are example speed profiles that are provided for illustration and should not be considered in a limiting sense. Generally any set of two or more speed profiles that allows material to selectively move toward the first end 13 or the second end 15 depending on which direction is selected by an operator may be used unless stated otherwise.

The controller 33 may change the speed profile to reverse the direction of material on the pan 9 by, for example, controlling the speed of rotation of the servomotor shafts 27A, 27B during a revolution of the shafts 27A, 27B. The controller 33 may produce an output signal based on the desired forward/reverse direction. The signal is transmitted to the motors 25A, 25B of each drive 8, 10 to vary the speed of the servomotor shaft 27.

Figure 17:
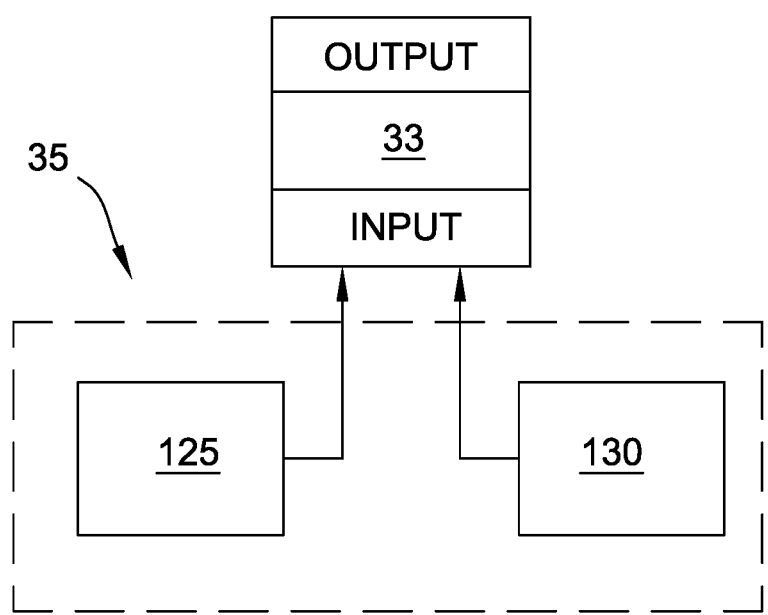
FIG. 17 is a schematic of a controller and user interface of the horizontal motion conveyor.
Figure 18:
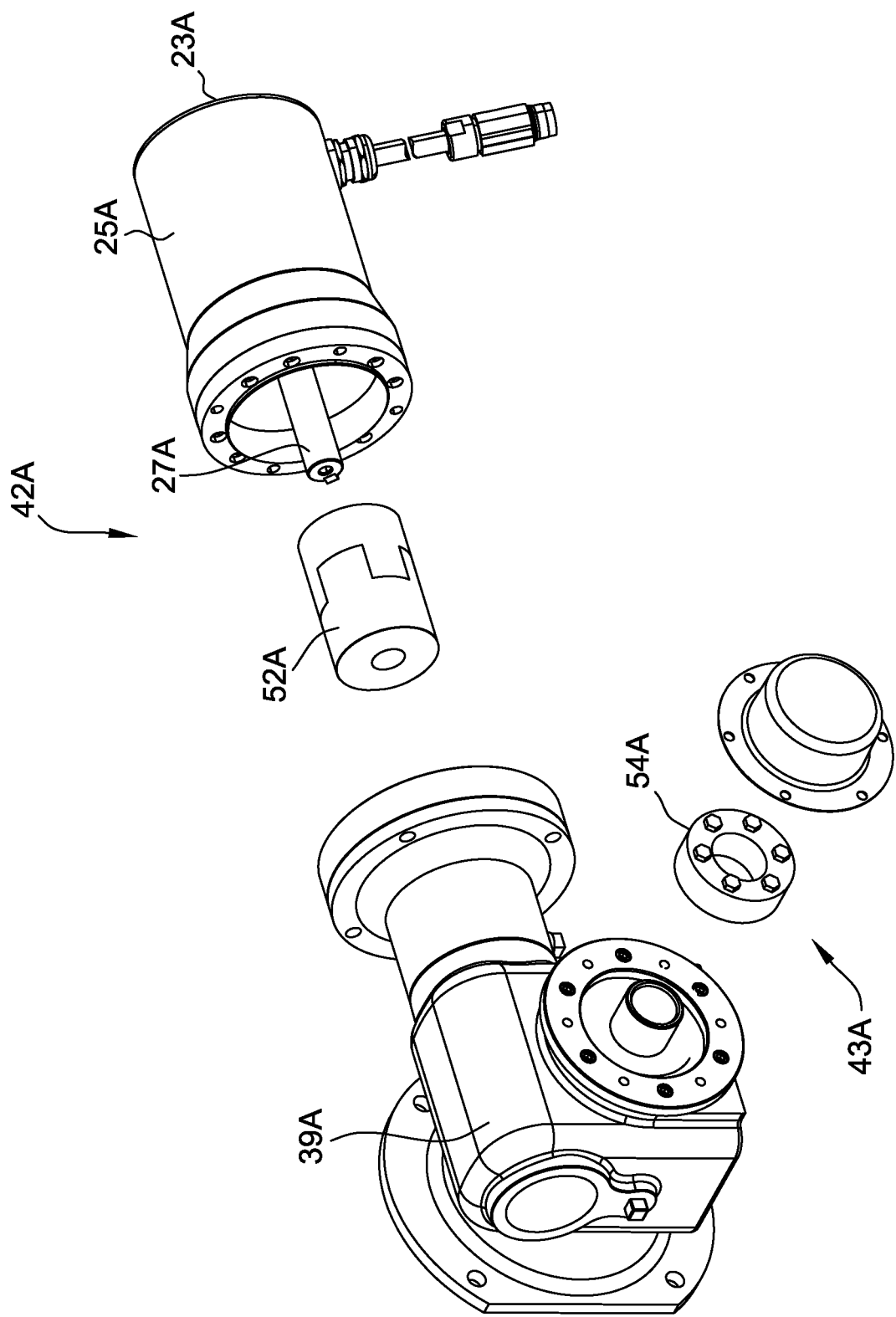
FIG. 18 is an exploded view of keyless lock couplings between the servomotor, gearbox, and drive shaft.

The controller 33 may adjust the profile based on input from the user interface 35. For example and with reference to FIG. 17, user interface 35 may include a forward-reverse control device 125 (e.g., switch, dial, touch-screen selection, computer input, or the like). The user interface 35 may also include a speed control device 130 that varies the speed at which material moves on the pan 9.

In some embodiments, at least two sets of instructions for varying the output of the servomotor 23 is stored in the controller memory. For example, the controller memory may store a set of instructions for forward direction and a set of instructions for reverse direction. Upon selection of a forward or reverse direction by an operator on the forward-reverse control device 125, the controller 33 produces signals based on the corresponding set of instructions that is associated with the selected direction.

In the illustrated embodiment, the horizontal motion conveyor 5 is able to reverse the direction of material on the pan 9 without reversing direction of the drives 8, 10 (e.g., without change of direction of the servomotors 23A, 23B and/or the camshafts 49A, 49B). The direction of the flow of material on the pan 9 may be reversed by altering the angular velocity of the servomotor 23A, 23B during a revolution of the camshafts 49A, 49B as described above.

In some embodiments, the conveyor 5 sets on the floor or is anchored to the floor or supporting framework, typically toward the first drive 8. In such embodiments, the first drive 8 may be referred to as a "stationary drive". In the illustrated embodiment, the conveyor 5 includes feet 11 that rest on the supporting surface. In some embodiments, the feet 11 are connected to the supporting surface. The feet 11 may be part of the first drive 8 (i.e., disposed below the first drive assembly 19A) and may be connected to the first drive frame 93A. Other methods may be used to secure the conveyor 5 to the supporting surface or external frame. In embodiments in which the first drive 8 is stationary, generally any method that allows the first drive 8 to be stationary relative to the supporting surface or external frame may be used unless stated otherwise.

In other embodiments, the first drive 8 is capable of floating (i.e., is not anchored to the floor or supporting framework and may move relative to the floor or supporting framework and/or may move relative to the second drive 10). In such embodiments, the first drive 8 may have a floating mechanism such as any of the floating mechanisms 75 described below in relation to the second drive 10.

The second drive 10 (which may also be referred to as a "floating drive") is able to float relative the first drive 8. By floating, the floating drive 10 may accommodate a small mismatch between the drive profiles of the floating drive 10 and the first drive 8 (and any other drives of the conveyor). The floating drive 10 includes one or more floating mechanisms 75 that enable the floating drive 10 to move relative to the first drive 8. In the embodiment illustrated in FIG. 1, the one or more floating mechanisms 75 are caster wheels 75. The floating drive 10 may include four floating mechanisms (e.g., caster wheels) as shown in FIG. 1 or more or less floating mechanisms 75 (e.g., 1, 2, 3, 4, 5, 6 or more floating mechanisms).

Figure 2:
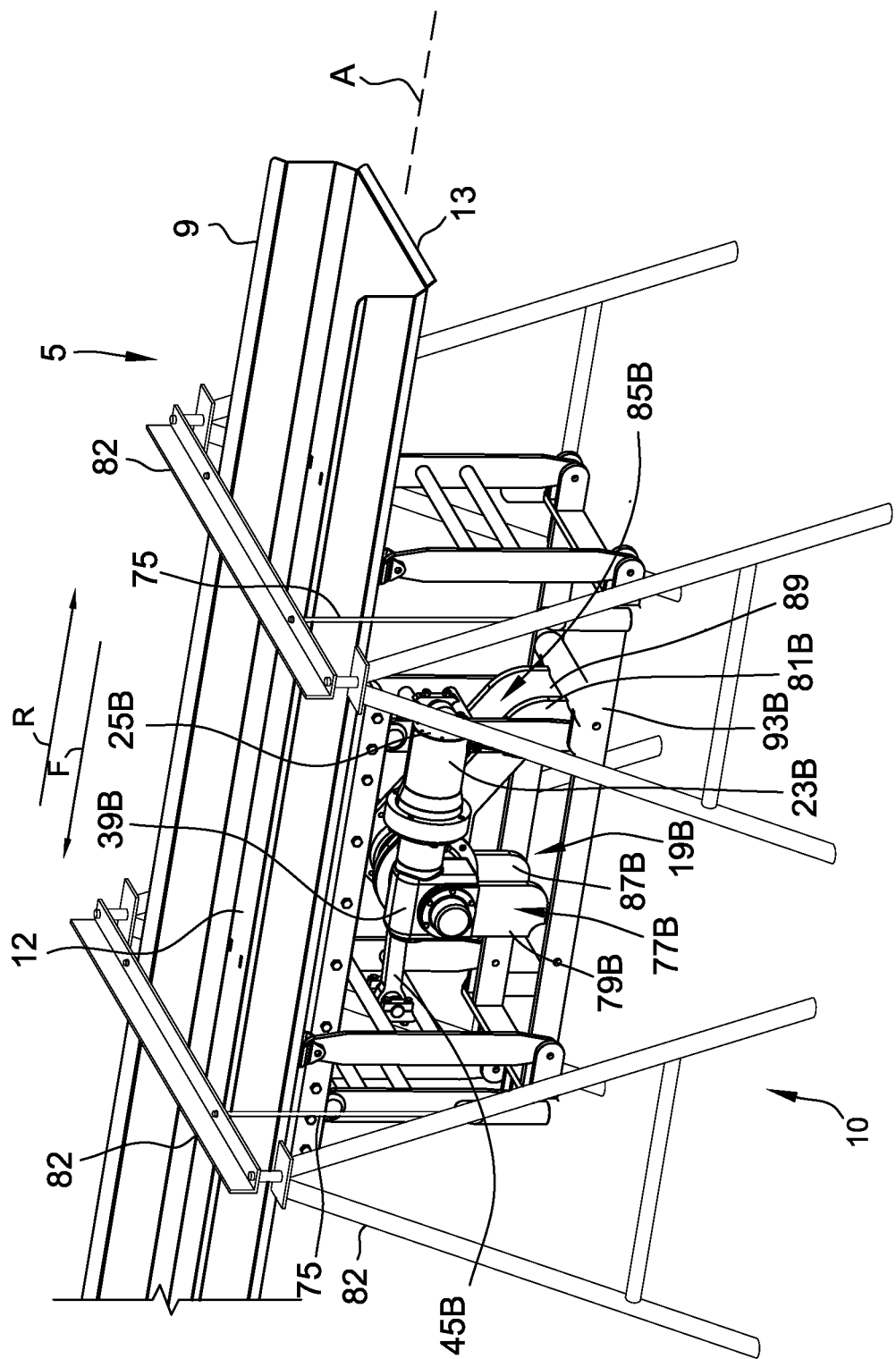
FIG. 2 is a perspective view of another embodiment of a horizontal motion conveyor.

In the embodiment of FIG. 2, the floating mechanism 75 is a flexible element (e.g., cable or relatively small diameter rod such as ½" rod). The flexible element 75 may support the drive 10. As shown in FIG. 2, the drive 10 is suspended from the flexible element 75 which is in turn connected to external frame members 82. The one or more flexible elements 75 may flex during operation of the conveyor 5 to allow the floating drive 10 to move relative to the longitudinal axis A and to match the drive profile of the first drive 8.

In some embodiments, the external frame member 82 to which the flexible element 75 is connected may be a ceiling structure. For example, both the first and second drives 8, 10 may be floating drives suspended from a ceiling structure (e.g., all drives of the conveyor 5 being floating drives with the conveyor 5 being suspended from the ceiling).

In the embodiment of FIG. 3, the floating mechanism 75 is a linear bearing 75. One or more linear bearings 75 may slide along rails 84 disposed below the drive 10. For example, the floating mechanism 75 may include two rails 84 opposite each other that are parallel to the longitudinal axis A with two linear bearings 75 sliding along a common rail 84. Alternatively, each linear bearing 75 may slide along a separate rail 84.

In some embodiments, the floating mechanism 75 is one or more rocker arms (e.g., the drive is suspended from a supporting structure by the one or more rocker arms or is connected to the floor or base structure by the rocker arm(s)). For example, one or more rocker arms may be pivotally connected to the drive frame 93 and pivotally connected to a supporting structure such as the external frame member 82 shown in FIG. 2 (i.e. as a substitute for the flexible element). Alternatively, one or more rocker arms may be pivotally connected to the drive frame 93 and pivotally connected to the floor or other base structure.

In the illustrated embodiments, the conveyor 5 includes one stationary drive 8 and one floating drive 10. In other embodiments, the conveyor 5 includes a stationary drive 8 and two or more floating drives 10 (e.g., at least two, at least four or at least ten floating drives or more) with the servomotor 23 of each drive (stationary and floating drives) being communicatively connected to a common controller 33. In other embodiments, the first and second drives 8, 10 are both floating drives. The conveyor 5 may include more than two floating drives (e.g., three, four, five, or ten or more drives). In some embodiments, each drive of the conveyor 5 is communicatively connected to a common controller 33. Use of additional floating drives allows for successively longer conveyors to be used (e.g., the conveyor 5 may have any length with inclusion of additional floating drives 10). The number of drives per length of conveyor 5 may be selected to achieve a sufficient speed at which material moves over the conveyor and depends, for example, on the size and power of each drive and the flow properties of the transported material. The conveyor 5 may be connected to other conveyors.

The horizontal motion conveyors of the present disclosure have several advantages over conventional horizontal motion conveyors. Use of a second drive allows the length of the conveyor to be increased. Use of multiple drives may lower the output required of the motors (i.e., compared to the motor of a single drive conveyor of equivalent length) and allows the drives to be smaller and less robust. Each drive may have the same sized motor regardless of the conveyor length which reduces inventory and simplifies the conveyor design and manufacture. Use of multiple, smaller counterweights may better offset the weight of the pan and puts less stress on linkages compared to use of one large counterweight. By using a floating drive as the second drive, the floating drive 10 may accommodate a relatively small mismatch between the drive profiles of the first and second drives. This reduces the noise of the conveyor and reduces knocking which can reduce the lifetime of the conveyor and/or cause components to become loose. Such mismatch may result from a mechanical mismatch (e.g., limited manufacturing tolerance) or from thermal expansion of one or more components of the conveyor.

In embodiments in which the drive motor is directly connected to the driveshaft (e.g., through a gearbox) of the drive, the conveyor is more reliable compared to conveyors using belts or chains which are susceptible to failure. The conveyor is also more sanitary as it includes less parts and guarding. In embodiments in which the speed profile (e.g., acceleration and deceleration) of the conveyor is changed by a controller to reverse direction of the flow of material on the pan, the conveyor may be reversed without stopping and/or reversing the drive assembly (e.g., drive motor), allowing the system to be reversed at full speed. This allows for the flow of the product to be reversed instantly and frequently. In embodiments in which the conveyor is driven by a servomotor, the speed profile of the pan may be controlled through the servomotor which reduces the complexity of the conveyor. The servomotor of each drive may be connected to a common controller to control the drives according to a common speed profile.

In embodiments in which the counterweight assembly is connected to a counterweight drive frame and a counterweight idler frame, the counterweight top structure may be disposed above at least a portion of the driveline of the drive assembly which allows the counterweight to be close to and in the line of action of the pan. This allows the mass of the counterweight to be reduced and allows the conveyor to operate more efficiently.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A horizontal motion conveyor for moving material comprising:
   a pan having a floor for carrying material toward an end of the pan;
   a first drive comprising:
      a first counterweight assembly for reducing the vibration of the conveyor;
      a first driveshaft that causes the pan to oscillate forward and back causing material to move toward an end of the pan and that enables the counterweight assembly to oscillate forward and back; and
      a first drive motor for rotating the driveshaft; and
   a second drive, the second drive being a floating drive and comprising:
      a second counterweight assembly for reducing the vibration of the conveyor;
      a second driveshaft that causes the pan to oscillate forward and back causing material to move toward an end of the pan and that enables the counterweight assembly to oscillate forward and back;
      a second drive motor for rotating the driveshaft; and
      a floating mechanism that enables the second drive to move relative to the first drive.

2. The horizontal motion conveyor as set forth in claim 1 wherein the floating mechanism is a caster wheel.

3. The horizontal motion conveyor as set forth in claim 1 wherein the floating mechanism is a flexible element capable of flexing to enable the floating drive to move relative to the first drive.

4. The horizontal motion conveyor as set forth in claim 3 wherein the pan is suspended from an external frame by the flexible mechanism.

5. The horizontal motion conveyor as set forth in claim 1 wherein the floating mechanism is a linear bearing.

6. The horizontal motion conveyor as set forth in claim 1 wherein the floating mechanism is a rocker arm.

7. The horizontal motion conveyor as set forth in claim 1 wherein each driveshaft is part of a camshaft.

8. The horizontal motion conveyor as set forth in claim 1 comprising a controller communicatively coupled to the first drive and communicatively coupled to the second drive, the controller controlling the rate of rotation of the driveshaft of the first drive and the rate of rotation of the driveshaft of the second drive.

9. The horizontal motion conveyor as set forth in claim 8 wherein the controller is configured to rotate both driveshafts according to a common acceleration and deceleration curve to move material in a first direction, the controller adjusting the curve about 180 degrees to move material in a second direction, the second direction being opposite the first direction.

10. The horizontal motion conveyor as set forth in claim 8 wherein both drive motors are a rotary servomotor having a servomotor shaft, the controller controlling the rate of rotation of the servomotor shaft.

11. The horizontal motion conveyor as set forth in claim 1 wherein each counterweight assembly includes a counterweight top structure disposed below the pan, the first drive and the second drive each comprising:
   a first crank arm that moves forward and back upon rotation of the driveshaft;
   a counterweight drive frame connected to the first crank arm and the counterweight top structure, the first crank arm pivoting the counterweight drive frame to move the counterweight top structure;
   a second crank arm that moves forward and back upon rotation of the driveshaft; and
   a pan drive frame connected to the second crank arm and the pan, the second crank arm pivoting the pan drive frame to move the pan.

12. The horizontal motion conveyor as set forth in claim 11 further comprising a counterweight idler frame, the counterweight idler frame and the counterweight drive frame being pivotally connected to the counterweight top structure.

13. The horizontal motion conveyor as set forth in claim 11 wherein the counterweight top structure is disposed above the driveshaft.

14. The horizontal motion conveyor as set forth in claim 11 wherein each driveshaft is part of a camshaft, the camshaft further comprising:
   a first cam that rotates to oscillate the counterweight top structure forward and back; and
   a second cam that rotates to oscillate the pan forward and back, the first and second cams being offset from each other to move the pan and counterweight in opposite directions as the pan and counterweight top structure oscillate forward and back.

15. The horizontal motion conveyor as set forth in claim 1 wherein the first drive is a stationary drive.

16. The horizontal motion conveyor as set forth in claim 1 wherein the first drive is a floating drive that is capable of moving relative to the second drive.

17. A horizontal motion conveyor for moving material comprising:
   a pan having a floor for carrying material toward an end of the pan;
   a first drive disposed below the pan that causes the pan to oscillate forward and back causing material to move toward an end of the pan, the first drive comprising a first driveshaft and a first drive motor that rotates the first driveshaft;
   a second drive disposed below the pan that causes the pan to oscillate forward and back causing material to move toward an end of the pan, the second drive comprising a second driveshaft and a second drive motor that rotates the second driveshaft; and
   a controller communicatively coupled to the first drive and communicatively coupled to the second drive, the controller controlling the rate of rotation of the first driveshaft and the rate of rotation of the second driveshaft.

18. The horizontal motion conveyor as set forth in claim 17 wherein the first drive is a first rotary servomotor and the second drive is a second rotary servomotor.

19. The horizontal motion conveyor as set forth in claim 18 wherein the first servomotor comprises a first servomotor shaft and the second servomotor comprises a second servomotor shaft, the controller being part of a servomotor control system for controlling the rotation and angular position of the first servomotor shaft and the second servomotor shaft, the servomotor control system further comprising:

a first sensor that determines the position of the first servomotor shaft, the first sensor being communicatively connected to the controller; and a second sensor that determines the position of the second servomotor shaft, the second sensor being communicatively connected to the controller.

20. The horizontal motion conveyor as set forth in claim 17 wherein the controller is configured to selectively rotate the first driveshaft and the second driveshaft according to a first acceleration and deceleration curve to move material in a first direction and a second acceleration and deceleration curve to move material in a second direction, the second direction being opposite the first direction.

* * * * *